US010242823B2

(12) United States Patent
Rink et al.

(10) Patent No.: US 10,242,823 B2
(45) Date of Patent: Mar. 26, 2019

(54) GUARD DOOR MONITORING SYSTEM

(71) Applicant: Pilz GmbH & Co. KG, Ostfildern (DE)

(72) Inventors: Joachim Rink, Ostfildern (DE); Markus Winkler, Ostfildern (DE)

(73) Assignee: PILZ GMBH & CO. KG, Ostfildern (DE)

( * ) Notice: Subject to any disclaimer, the term of this patent is extended or adjusted under 35 U.S.C. 154(b) by 652 days.

(21) Appl. No.: 14/704,255

(22) Filed: May 5, 2015

(65) Prior Publication Data
US 2015/0275551 A1 Oct. 1, 2015

Related U.S. Application Data

(63) Continuation of application No. PCT/EP2013/074436, filed on Nov. 22, 2013.

(30) Foreign Application Priority Data

Nov. 23, 2012 (DE) .................. 10 2012 111 342

(51) Int. Cl.
H01H 27/00 (2006.01)
F16P 3/08 (2006.01)
E05B 47/00 (2006.01)

(52) U.S. Cl.
CPC ........... H01H 27/007 (2013.01); E05B 47/00 (2013.01); E05B 47/0038 (2013.01); F16P 3/08 (2013.01);
(Continued)

(58) Field of Classification Search
CPC ...... H01H 27/00; H01H 27/007; H01H 3/022; H01H 2300/026; H01H 2300/028;
(Continued)

(56) References Cited

U.S. PATENT DOCUMENTS 361,149 A * 4/1887 Eilmann ............. E05B 65/0864
24/586.1
1,328,106 A * 1/1920 Stone ...................... E05B 65/50
70/69
(Continued)

FOREIGN PATENT DOCUMENTS

CN 101815892 8/2010
DE 10 2008 032 246 A1 1/2010
(Continued)

OTHER PUBLICATIONS

International Search Report for PCT/EP2013/074436; dated Mar. 2014; 10 pp.
(Continued)

Primary Examiner — Alyson M Merlino
(74) Attorney, Agent, or Firm — Harness, Dickey & Pierce, P.L.C.

(57) ABSTRACT

A guard door monitoring system comprising a guard door monitoring module for monitoring a state of a guard door to a safety area. The guard door monitoring system also comprises a control unit, configured to analyze a guard door signal generated by interaction between an actuator and a sensor, and to control a machine or system located in the safety area depending on the guard door signal. A locking device with a main body and a locking lever arranged on the main body is additionally provided. The locking lever can be moved relative to the main body from a release position into a blocking position in which the locking lever prevents the interaction between the actuator and the sensor, wherein the locking device comprises a receptacle for a lockable securing part, which, when introduced into the receptacle, keeps the locking lever in the blocking position.

10 Claims, 5 Drawing Sheets

(52) U.S. Cl.
CPC ..... *E05B 2047/0068* (2013.01); *Y10T 70/625* (2015.04); *Y10T 70/80* (2015.04)

(58) Field of Classification Search
CPC .............. H01H 3/227; H01H 27/002; Y10T 292/0886; Y10T 292/0887; Y10T 292/089; Y10T 292/0891; Y10T 292/0893; Y10T 292/71; Y10T 292/696; Y10T 292/702; Y10T 292/79; Y10T 292/513; Y10T 292/522; Y10T 292/31; Y10T 292/323; Y10T 292/0863; Y10T 292/0864; Y10T 292/0867; Y10T 292/0869; F16P 3/08; F16P 3/10; F16P 3/00; F16P 3/12; E05C 5/00; E05C 5/02; E05C 17/00; E05C 17/02; E05C 17/04; E05C 17/44; E05C 17/443; E05C 17/46; E05C 17/50; E05C 17/54; E05C 17/60; E05C 47/00; E05C 47/002; E05B 47/00; E05B 47/002; E05B 47/0038; E05B 2047/0068; H02H 5/00; H02H 5/12; G08G 1/042
USPC .......... 307/326, 328, 132 EA, 142; 361/139, 361/144, 179, 180; 200/43.01, 43.16, 200/43.19, 334, 61.62; 340/5.2, 5.7
See application file for complete search history.

(56) References Cited

U.S. PATENT DOCUMENTS

| | | | | |
|---|---|---|---|---|
| 4,136,898 | A * | 1/1979 | Guenther | E05C 3/042 292/244 |
| 5,026,100 | A * | 6/1991 | Hulkenberg, Jr. | E05B 65/0053 292/285 |
| 5,865,483 | A * | 2/1999 | Dubravin | E05B 7/00 292/201 |
| 6,268,574 | B1 | 7/2001 | Edens | |
| 6,925,785 | B1 * | 8/2005 | Kawasaki | A45C 13/10 292/57 |
| 9,284,764 | B2 * | 3/2016 | Hudson | E05D 15/16 |
| 2004/0061341 | A1 * | 4/2004 | Hodge | B65F 1/1615 292/336.3 |
| 2008/0156623 | A1 * | 7/2008 | Sukarukoff | H01H 3/163 200/61.68 |
| 2015/0228421 | A1 * | 8/2015 | Thomas | H01H 9/226 200/50.04 |
| 2017/0336026 | A1 * | 11/2017 | Pizzato | F16P 3/08 |

FOREIGN PATENT DOCUMENTS

| | | | | |
|---|---|---|---|---|
| DE | 102011119413 A1 * | 5/2013 | | F16P 3/08 |
| EP | 2112674 A2 * | 10/2009 | | H01H 27/002 |
| JP | 5-99399 | 4/1993 | | |
| JP | 2002-71091 | 3/2002 | | |
| JP | 2004-353849 | 12/2004 | | |
| JP | 2007-225019 | 9/2007 | | |
| JP | 2008-186757 | 8/2008 | | |
| WO | WO 03/025963 A1 | 3/2003 | | |

OTHER PUBLICATIONS

Series Connection PSEN with PDP67 F 4 code; Feb. 6, 2012; 29 pp.
Chinese Examination Report (including English translation); dated Oct. 8, 2016; 11 pp.
ISA/EP; English language translation of International Preliminary Report on Patentability (Chapter 1) for PCT/EP2013/074436; dated May 26, 2015; 9 pp.

* cited by examiner

GUARD DOOR MONITORING SYSTEM

CROSS REFERENCES TO RELATED APPLICATIONS

This application is a continuation of international patent application PCT/EP2013/074436, filed on Nov. 22, 2013 designating the U.S., which international patent application has been published in German language and claims priority from German patent application DE 10 2012 111 342.4, filed on Nov. 23, 2012. The entire contents of these priority applications are incorporated herein by reference.

BACKGROUND OF THE INVENTION

This disclosure relates to a guard door monitoring system comprising a guard door as an entrance to a safety area, a guard door monitoring module for monitoring a state of the guard door, wherein the guard door monitoring module has an actuator and a sensor, which can be brought into interaction with one another in an electrically contactless manner and thereby generate a guard door signal, and a control unit, which is configured to analyze the guard door signal and to control a machine or system located in the safety area depending on the guard door signal.

The applicant markets a guard door monitoring module of the above-mentioned type under the name "PSENslock", which can be used in a versatile manner and is suitable for applications up to the highest security level PL e (Performance Level e according to ISO 13849-1). A detailed product documentation regarding this product is available on the homepage of the applicant (http://www.pilz.de; Application Note—No. 1002459_DE_01 of 06.02.2012).

Guard door monitoring systems of this type are used on guard doors that are intended to prevent access to a machine or system working in an automated manner, provided the machine or system is located in a dangerous state. The access to these machines or systems can also be granted just as well via protective flaps, hoods and pivoting or sliding doors. These entrances are also to be understood as guard doors in the present context.

In order to prevent an operator from reaching the working or safety area during a dangerous machine movement, the safety area is often separated off from the outside world by a protective housing. The access to the safety area is then usually only possible through one or more guard doors in the protective housing.

Machines or systems in which protective housings of this type are used for example include robots, machine tools with a rapidly rotating spindle, transport or conveying systems, presses or other machines and systems of which the operation poses a risk to people located in the working range of the machine. Guard door monitoring modules provided on guard doors can be used as signaling devices, with the aid of which a control device can identify the closed state of the guard door. The control device is configured to enable start-up of the machine or system only when the guard door is closed. If the guard door is opened (if possible) during running operation, the control device must bring the machine or system into a safe state, in which for example the power supply to the machine or system is switched off.

There are a large number of machines and systems that still pose a risk for a certain time even after the switch-off, for example because the machine or system still continues to run. This time is also referred to as the run-down time of the system. In these cases special guard door monitoring modules and/or safety switches are required. Such safety switches prevent the guard door from being opened until the machine system has reached its safe state. This function is referred to as locking of the guard door.

The known safety switches conventionally have what is known as an actuator, which is arranged on the movable guard door. When the guard door is closed the actuator engages with an actuator receptacle on the door frame, which is detected with the aid of one or more sensors. In the case of a safety switch with locking, the actuator is additionally blocked in the actuator receptacle against removal. The actuator in this case thus performs two functions, specifically on the one hand it acts as a detector element, with the aid of which the closed position of the guard door can be detected, and on the other hand it acts as a bolt, which prevents the guard door from being opened as long as the actuator is blocked in the actuator receptacle. The locking can be provided for example via an actuator driven by an electric motor or via an electromagnetic actuator, which is actuated by the control device until the monitored machine or system has reached the safe state thereof.

An example for such a safety switch with locking system is also disclosed in EP 1 430 497 A1.

However, the above-described locking on the guard doors do not always have to perform only safety-relevant functions, such as the prevention of access to the safety area during the run-down time of the system. Lockings are also often used as process protection. In this case the locking prevents an accidental system interruption by the operator. Although a locking in some cases of application is not necessary from safety viewpoints, it then at least prevents an accidental interruption of the production process. Since a renewed start-up of the system may be complicated and time-consuming depending on the complexity of the system, important production time and therefore also production costs can be saved by such a process protection. It goes without saying that the above-described guard door monitoring modules, which are also referred to as safety switches, can also be used combined as process protection with safety-relevant function.

Irrespective of whether safety switches with or without locking are used on the guard doors, problems often occur in practice as a result of incorrect operation and intentional or unintentional manipulations of the safety devices. A manipulation protection of these safety and monitoring systems is therefore of immense importance. However, safety gaps may also sometimes occur unintentionally due to incorrect handling on the part of the operating staff and must be prevented at all costs. For example, in the case of the above-mentioned guard door monitoring systems, there could be a situation in which an operator gains access to the system, wherein the system is duly switched off as the guard door is opened. However, if a second operator now does not notice the first operator in the safety area, closes the guard door again and starts the system, this could lead to a significant safety risk of the first operator within the system. Such a situation is conceivable in particular in very large systems into which it is difficult to see.

SUMMARY OF THE INVENTION

It is an object to provide an improved guard door monitoring system with extended safety functions and increased manipulation protection.

In accordance with an aspect of the present disclosure, a guard door monitoring system is presented, comprising: (i) a guard door as an entrance to a safety area; (ii) a guard door monitoring module for monitoring a state of the guard door, wherein the guard door monitoring module has an actuator and a sensor, which can be brought into interaction with one another in an electrically contactless manner and thereby generate a guard door signal; (iii) a control unit, which is configured to analyze the guard door signal and to control a machine or system located in the safety area depending on the guard door signal; and (iv) a locking device with a main body and a locking lever arranged on the main body, wherein the locking lever can be moved relative to the main body from a release position into a blocking position in which the locking lever prevents the electrically contactless interaction between the actuator and the sensor, wherein the locking device comprises a receptacle for a lockable securing part, which, when introduced into the receptacle, keeps the locking lever in the blocking position.

In accordance with a further aspect of the present disclosure, a guard door monitoring system is presented, comprising: (i) a guard door as an entrance to a safety area; (ii) a guard door monitoring module for monitoring a state of the guard door, wherein the guard door monitoring module has an actuator and a sensor, which can be brought into interaction with one another in an electrically contactless manner and thereby generate a guard door signal; (iii) a control unit, which is configured to analyze the guard door signal and to control a machine or system located in the safety area depending on the guard door signal; and (iv) a locking device with a main body and a locking lever arranged on the main body, wherein the locking lever is mechanically pivotable relative to the main body about a pivot axis from a release position into a blocking position in which the locking lever prevents the electrically contactless interaction between the actuator and the sensor, wherein the locking lever is coupled to the main body via a spring element which is arranged along the pivot axis, wherein the spring element in the release position and/or in the blocking position exerts a spring force that pushes the locking lever against the main body, and wherein the locking device comprises a receptacle for a lockable securing part, which, when introduced into the receptacle, keeps the locking lever in the blocking position.

In accordance with a further aspect of the present disclosure, a guard door monitoring system is presented, comprising: (i) a guard door as an entrance to a safety area; (ii) a guard door monitoring module for monitoring a state of the guard door, wherein the guard door monitoring module has an actuator and a sensor, which can be brought into interaction with one another in an electrically contactless manner and thereby generate a guard door signal; (iii) a control unit, which is configured to analyze the guard door signal and to control a machine or system located in the safety area depending on the guard door signal; and (iv) a locking device with a main body and a locking lever arranged on the main body, wherein the locking lever is mechanically pivotable relative to the main body about a pivot axis from a release position into a blocking position in which the locking lever prevents the electrically contactless interaction between the actuator and the sensor, wherein a first and a second recess are provided on the main body, wherein the locking lever latches in the release position by arrangement in the first recess and latches in the blocking position by arrangement in the second recess, and wherein the locking device comprises a receptacle for a lockable securing part, which, when introduced into the receptacle, keeps the locking lever in the blocking position.

In accordance with a still further aspect of the present disclosure, it is presented a locking device for a guard door monitoring module which monitors a state of a guard door and has an actuator and also a sensor which can be brought into interaction with one another in an electrically contactless manner and thereby generate a guard door signal, wherein the locking device has a main body and a locking lever arranged on the main body, wherein the locking lever is mechanically pivotable relative to the main body about a pivot axis from a release position into a blocking position in which the locking lever prevents the electrically contactless interaction between the actuator and the sensor, wherein the locking lever is coupled to the main body via a spring element which is arranged along the pivot axis, wherein the spring element in the release position and/or in the blocking position exerts a spring force that pushes the locking lever against the main body, and wherein the locking device comprises a receptacle for a lockable securing part, which, when introduced into the receptacle, keeps the locking lever in the blocking position.

In accordance with a still further aspect of the present disclosure, it is presented a locking device for a guard door monitoring module which monitors a state of a guard door and has an actuator and also a sensor which can be brought into interaction with one another in an electrically contactless manner and thereby generate a guard door signal, wherein the locking device has a main body and a locking lever arranged on the main body, wherein the locking lever is mechanically pivotable relative to the main body about a pivot axis from a release position into a blocking position in which the locking lever prevents the electrically contactless interaction between the actuator and the sensor, wherein a first and a second recess are provided on the main body, wherein the locking lever latches in the release position by arrangement in the first recess and latches in the blocking position by arrangement in the second recess, and wherein the locking device comprises a receptacle for a lockable securing part, which, when introduced into the receptacle, keeps the locking lever in the blocking position.

The additional locking device enables an operator, when entering the safety area, to bring the aforementioned locking lever from the release position thereof into the blocking position. In the blocking position the locking lever prevents the electrically contactless interaction between the actuator and the sensor. The safety gaps mentioned in the introduction by way of example, i.e. the fact that the machine or system is restarted at a moment in time during which an operator is located within the safety area, are thus closed.

An operator who gains access through the guard door to the safety area automatically opens the electrically contactless connection between actuator and sensor of the guard door monitoring module, whereby the control unit receives the guard door signal "door opened" and thereupon switches off the machine or system. The operator can then bring the locking lever into the blocking position and can additionally secure this blocking position by use of a lockable securing part, for example a padlock. Since the locking lever in the blocking position prevents the contactless interaction between the actuator and the sensor, it is not possible during this time, irrespective of the position of the guard door, for the control unit to receive the guard door signal "guard door closed" and for the machine to be restarted. Should a second operator then attempt to restart the machine or system, this is made impossible without bringing the locking lever back into the release position thereof. However, to do this the second operator requires the key for the lockable securing part (for example for the padlock). The keys should therefore be allocated personally, such that in the specified example only the first operator can restart the machine or system as soon as he has left the safety area.

The locking lever can be of relatively simple design. As already mentioned, it does not have to be suitable for preventing the electrically contactless interaction between the actuator and the sensor. In practice this electrically contactless interaction occurs by means of a transponder provided in the actuator and a detector provided accordingly in the sensor. An RFID transponder is preferably used as transponder. Due to the individual identification of such RFID transponders, additional protection against manipulation is provided. The transmission and receiving strength of the transponder and/or detector can be set such that no signal is received by the detector and/or sensor respectively when the locking lever is in a blocking position. An unintentional guard door signal "guard door closed" is thus practically impossible when the locking lever is in the blocking position.

In a refinement, the guard door monitoring module further comprises an electromagnet for a magnetic locking of the guard door.

This locking can perform a safety-relevant function and/ or can be used as process protection. Depending on the application, the electromagnet preferably generates a locking force on the guard door in the range from 500 to 1000 N. The electromagnetic locking force prevents an unintentional opening of the guard door and offers maximum security by the actuator, which is secured against manipulation. If the electromagnet performs a safety-relevant function, it can be controlled for example by the control unit in such a way that the electromagnet only releases the guard door when the machine or system located in the safety area has been switched off and has come to a complete stop following the run-down time. Conversely, locking force generated by the electromagnet is then only produced when the sensor detects the actuator or the RFID transponder and forwards the guard door signal "door closed" to the control unit. Since this is prevented in accordance with the present disclosure by the locking device in the blocking position, this can only occur when the lockable securing part has been removed and the locking lever has been brought into the release position.

In a further refinement, the locking lever in the blocking position prevents the electrically contactless interaction between the actuator and the sensor by mechanically distancing the actuator and the sensor from one another.

The locking lever is thus arranged in the blocking position thereof in such a way that it passes between the actuator (RFID transponder) and the sensor when an attempt is made to close the door. In this state the guard door then preferably also can no longer close. The locking lever in the blocking position thus keeps the actuator sufficiently far away from the sensor, such that the sensor cannot receive the signal of the actuator or cannot receive said signal with sufficient strength.

In a further refinement, the sensor is arranged on a first part of the guard door and the actuator is arranged on a second part of the guard door, wherein the two parts are separated from one another when the guard door is opened.

Guard doors provided with guard door monitoring modules are often also referred to as separating protective devices. Both in the case of a pivoting door and in the case of a sliding door, the aforementioned two parts of the guard door in practice are usually the door itself and the door frame. The latter, in technical jargon, is often also referred to as a doorjamb. It should be noted that the position of actuator and sensor in principle can be swapped. The actuator of the guard door monitoring module for example can be arranged on the door, and the sensor of the guard door monitoring module can be arranged accordingly on the doorjamb. Alternatively, however, the sensor can also be arranged on the door itself, such that in this case the actuator is arranged on the doorjamb.

In a further refinement, the locking device is arranged on the first part of the guard door.

The locking device is in this case mounted preferably detachably on the housing of the sensor. This can be implemented for example with the aid of screws. However, other fastening possibilities are also conceivable of course. The locking device in this case can be fastened jointly with the censor either to the door or alternatively, as already described above, to the doorjamb.

In an alternative refinement, the locking device is arranged on the second part of the guard door.

Since the locking device or the locking lever preferably prevents the electrically contactless interaction between the actuator and the sensor in that it distances these two components from one another and prevents direct contact between the sensor and the actuator, the locking device in principle can also be arranged on the housing of the actuator. In this refinement as well, detachable and also fixed connections are conceivable between the locking device and the housing of the actuator. The locking device can be fastened jointly with the actuator both to the door and alternatively to the doorjamb. This can be varied depending on the application and spatial requirement.

In a further refinement, the locking lever is mechanically pivotable relative to the main body about a pivot axis from the release position into the blocking position.

In principle, it is also conceivable that the locking lever is brought from the release position into the blocking position by a linear displacement instead of by a pivoting motion. Both a displacement and a pivoting of the locking lever can be implemented either automatically at the push of a button, for example with the aid of an electric motor, but also mechanically by hand. However, a mechanical pivotability by hand is a simple and economical solution. The locking lever is preferably pivoted through 90° in order to bring this from the release position into its blocking position and vice versa. The longitudinal direction of the locking lever thus encloses therewith an angle of preferably 90° in the blocking position in comparison with the release position.

In accordance with a further refinement, a holding grip is provided on the locking lever in order to be able to pivot the locking lever as easily as possible by hand, said holding grip running substantially along the pivot axis.

With the aid of this holding grip the locking lever can be rotated or pivoted relatively easily. For simple and comfortable handling, this holding grip can also be ergonomically shaped. By mounting the holding grip along the pivot axis of the locking lever, the force necessary to pivot or rotate said lever can be transmitted very easily to the locking lever. The locking lever itself is preferably plate-shaped here, such that it can be arranged between the actuator and the sensor in the blocking position.

In a further refinement, the locking lever is coupled to the main body via a spring element which is arranged along the pivot axis, wherein the spring element in the release position and/or in the blocking position exerts a spring force that pushes the locking lever against the main body.

By way of example, a mechanical compression spring can be used as spring element. However, a pneumatic or hydraulic spring element would also be conceivable in principle. The spring force exerted onto the locking lever by the spring element essentially has the purpose of preventing an unintentional release of the locking lever from the release position thereof and/or from the blocking position thereof. It pushes the locking lever against the main body of the locking device. In order to be able to pivot the locking lever from the blocking position into the release position or vice versa, the operator must therefore initially slightly lift the locking lever, against the action of the spring force. The spring force exerted by the spring element therefore should not be too great.

In a further refinement, the locking lever can be latched to the main body in the release position and/or in the blocking position.

The locking lever can preferably be latched to the main body both in the release position and in the blocking position. Such a latchability of the locking lever, in addition to the above-mentioned spring element, provides protection against an unintentional pivoting of the locking lever from the blocking position or the release position. The positions of the locking lever in the release position and the blocking position are thus also defined exactly. This simplifies the handling for the operator.

In accordance with a refinement, a first and a second recess are provided on the main body, wherein the locking lever latches in the release position by arrangement in the first recess and latches in the blocking position by arrangement in the second recess.

These recesses enable a mechanically simple and yet stable latchability of the locking lever. In particular in combination with the spring element already mentioned above, the locking lever is thus drawn virtually automatically on account of the spring force into the respective recess, specifically upon reaching the blocking position or the release position. This latching can then be released in turn by lifting the locking lever against the spring force. The two recesses provided in the main body are preferably arranged orthogonally to one another.

In a further refinement, the receptacle for the lockable securing part is formed as a bore in the locking lever.

A padlock used as lockable securing part can thus be inserted directly into the bore provided in the locking lever. The bore is preferably only accessible when the locking lever is in the blocking position. A padlock can thus then only be fastened to the locking device when the locking lever is in the blocking position. The position of the bore should additionally also be selected such that the locking lever can no longer move or pivot from the blocking position into the release position when a padlock is inserted into the bore. This is prevented in that the padlock, when an attempt is made to pivot the lever, collides with the main body of the locking device. The aforementioned bore is for this purpose preferably arranged in the region of an end of the plate-shaped locking lever.

In a further refinement, a recess is provided on the main body, wherein said recess is in the blocking position of the locking lever at least partially aligned with the bore provided in the locking lever.

This recess can be provided either as a bore or as a type of indentation in the main body. Since this recess in the blocking position of the locking lever is aligned with the bore provided in the locking lever, a sort of form fit between the hoop of the padlock and the bore and also the recess on the main body is created when a padlock is inserted into the bore. The padlock in the blocking position of the locking lever therefore is not only inserted into the bore of the locking lever, but also into the recess of the main body. If the bore and recess in the blocking position are arranged exactly one above the other, the locking lever with inserted padlock thus can no longer be pivoted without destroying the padlock or the locking device. The additional protection provided by the locking device therefore cannot be manipulated unintentionally. A closure of the door or an electrically contactless interaction between actuator and sensor is ruled out in the meantime.

In order to be able to close even more effectively the safety gaps mentioned in the introduction, two bores are preferably provided on the locking lever. More specifically, in accordance with a further refinement, two bores are provided on the locking lever each as receptacle for a lockable securing part, and two recesses are provided on the main body, which recesses in the blocking position of the locking lever are at least partially aligned with the bores provided in the locking lever.

In accordance with this refinement, the locking lever has two plug-in openings so to speak for one padlock each. Such a refinement is advantageous in particular with multiple operators of the machine or system. A first operator upon entering the safety area secures the guard door monitoring module by means of a first padlock. Should a second person then enter the safety area, this person can also secure the locking lever in the blocking position by inserting or fitting a second padlock in the second bore of the locking lever. Should the first operator then leave the safety area, thus causing the guard door to close, said first operator immediately identifies on account of the second padlock that a further person is still located in the safety area. The two operators can therefore only jointly bring the locking lever back into the release position thereof by removing both padlocks from the locking lever. Even with two operators it would therefore be ensured that neither of the two is located in the safety area when the guard door is closed and the machine or system is placed back in operation. It goes without saying that more than two bores or receptacles for padlocks can of course also be provided on the locking device depending on the number of potential operators.

It goes without saying that the features specified above and the features yet to be explained hereinafter can be used not only in the specified combination, but also in other combinations or in isolation without departing from the scope of the present disclosure. It is also noted that the above-mentioned refinements and the features defined in the dependent claims refer not only to the guard door monitoring system, but also to the locking device itself.

DESCRIPTION OF PREFERRED EMBODIMENTS

Figure 1:
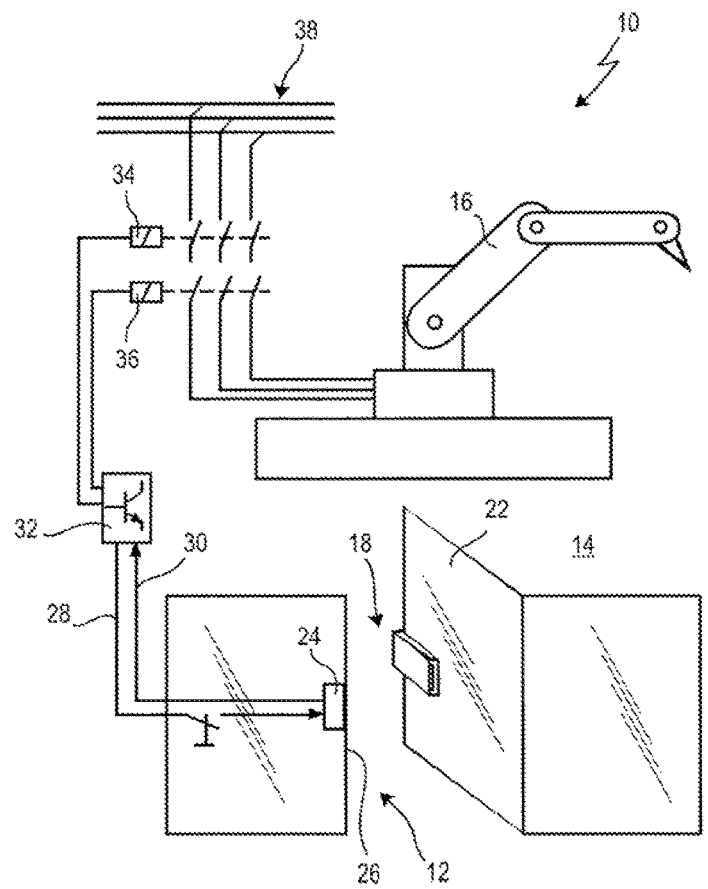
FIG. 1 shows a schematic illustration of a guard door monitoring system.

In FIG. 1 a guard door monitoring system is denoted in its entirety with the reference numeral 10. The guard door monitoring system 10 includes a guard door 12, which secures the access to a safety area 14. By way of example, a robot 16 can be arranged in the safety area 14. Since such a robot 16 poses a high injury risk during operation thereof for an operator or other person located in the safety area 14, access to the safety area 14 during operation of the robot 16 must be prevented. This is ensured in the present case via a guard door monitoring module 18, which is arranged on the guard door 12 or in the region of the guard door 12.

The guard door monitoring module 18 for example includes a door part 20, which is fastened to a movable part 22 of the guard door 12, and a frame part 24, which is arranged on a door counterpiece 26. In the illustrated exemplary embodiment the door counterpiece 26 is a fixed stop for the movable part 22 of the guard door 12. However, in other exemplary embodiments the door counterpiece 26 may also be a second door leaf of a two-part guard door. In addition, it should be noted that the guard door 12 can also be formed as a sliding door instead of a pivotable guard door. Hoods, flaps or other separating protective devices, via which access to a safety area 14 is possible, are also understood to be guard doors in the present sense.

The frame part 24 of the guard door monitoring module 18 is connected to a control unit 32 via two lines 28, 30 in the shown exemplary embodiment. This connection can also be formed in a cable-free manner. In addition, more than two lines 28, 30 or also just one line can be provided between these two parts. The control unit 32 for example can be a safety switching device from the series PNOZ®, which is marketed by the applicant of the present disclosure. These are multi-channel redundant safety switching devices, which are configured to evaluate the output signals of signaling devices, such as the guard door monitoring module 18, and to switch off an electrical consumer depending on said signals. The electrical consumer is in this case the robot 16. The control unit 32 accordingly controls two gates 34, 36, of which the working contacts are arranged in the connection between a power supply 38 and the robot 16.

Alternatively to the safety switching device, the control unit 32 could also be formed as a programmable safety controller. The guard door monitoring module 18 would in this case be connected for example to a programmable safety controller, as is marketed by the applicant of the present disclosure under the name PSS®.

Due to the cooperation of the guard door 12, the guard door monitoring module 18 and the control unit 32, the power supply to the machine or system 16 located in the safety area 14 is interrupted automatically as soon as the guard door 12 is opened. The machine or system 16 can only be restarted once the guard door 12 has been closed again. The guard door monitoring module 18 thus monitors the state of the guard door 12 and forwards a corresponding guard door signal ("door opened" or "door closed") to the control unit 32. The guard door monitoring module 18 can be formed for example by the guard door system PSENslock, which is marketed by the applicant of the present disclosure. The fundamental operating principle of the guard door monitoring module 18 will be explained in greater detail hereinafter on the basis of the schematic illustration shown in FIG. 2.

The guard door monitoring module 18 has an actuator 40 and a sensor 42. The actuator 40 and sensor 42 can be brought into interaction with one another in an electrically contactless manner. The actuator 40 is usually a transmitter or transponder, of which signals can be detected by the sensor 42. Provided the actuator or transponder 40 is brought close enough to the sensor 42, a guard door signal "door closed" is thus generated, which is forwarded to the control unit 32.

Figure 2:
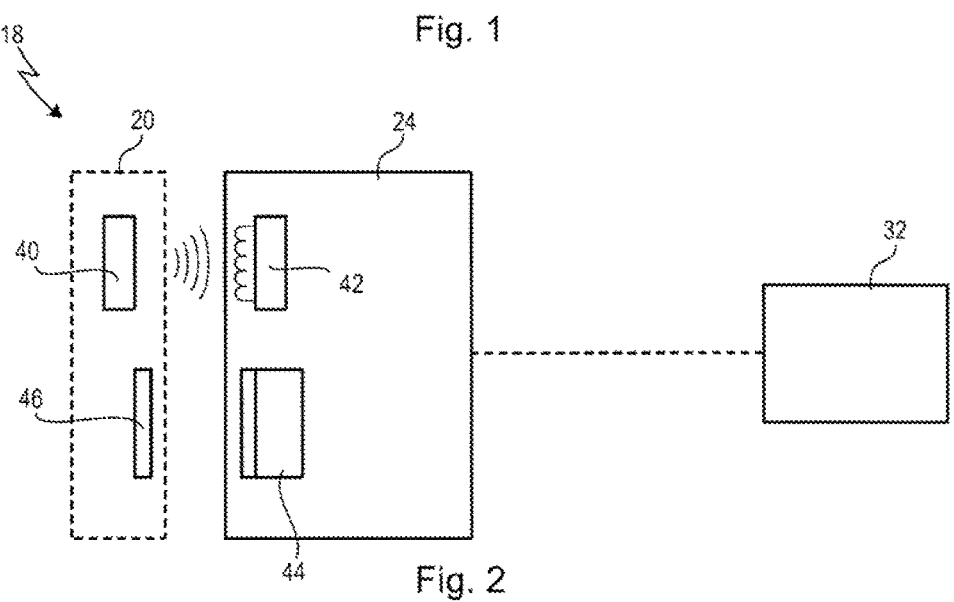
FIG. 2 shows a schematic illustration of an exemplary embodiment of a guard door monitoring module according to the disclosure.

In the schematic illustration shown in FIG. 2 the actuator 40 is arranged in the door part 20 and the sensor 42 is arranged in the frame part 24 of the guard door monitoring module 18. However, it should be noted that the position of actuator 40 and sensor 42 of course can be swapped. The sensor 42 could thus also be arranged just as easily in the door part 20 illustrated schematically in FIG. 1, wherein the actuator 40 would then be arranged accordingly in the frame part 24, illustrated schematically in FIG. 1, of the guard door monitoring module 18. Here, it is merely important that the actuator 40 and sensor 42 are arranged on different parts 22, 26 of the guard door 12, which are separated from one another when the guard door 12 is opened. Here, the sensor 42 is preferably always connected to the control unit 32.

In order to ensure the highest possible protection against manipulation, the described interaction between actuator 40 and sensor 42 is preferably a coded interaction. The actuator 40 can be formed for example as a coded RFID transponder, which can clearly be identified by the sensor 42. A manipulation attempt to generate the guard door signal "guard door closed" via another transponder or another object will therefore fail. Such a system is marketed by the applicant of the present disclosure under the name PSENcode.

The schematic illustration in FIG. 2 also shows that the guard door monitoring module 18 can be provided optionally with a locking function (also referred to as locking). This locking preferably includes an electromagnet 44 and a magnetizable counterpiece 46. The position thereof between door part 20 and frame part 24 can also be swapped. The electromagnet 44 exerts a locking force onto the magnetizable counterpiece, which force is intended to prevent an unintentional opening of the guard door 12. This locking force preferably lies in the range from 500 to 1000 N. The 'locking' may have a safety-relevant function or alternatively may act as pure process protection depending on the application. Provided the locking has a safety-relevant function, this is formed in such a way that the electromagnet 44 only releases the guard door 12 when the machine or system 16 located in the safety area 14 has come completely to a stop and no longer poses a danger. The electromagnet 44 can be controlled in this case by the control unit 32. If, by contrast, the locking is used as pure process protection, the electromagnet 44 does not absolutely necessarily have to be controlled by the control unit 32, however this is preferred nonetheless. The locking then "only" causes a locking force, which warns an operator against or prevents said operator from opening the guard door 12 unintentionally. If the locking force is overcome nevertheless, the machine or system 16 located in the safety area 14 is stopped immediately without posing any risk to the operator. Here, as already described above, the sensor 42 forwards the guard door signal "guard door opened" to the control unit 32, which thereupon immediately interrupts the power feed to the machine or system 16.

Figure 3A:
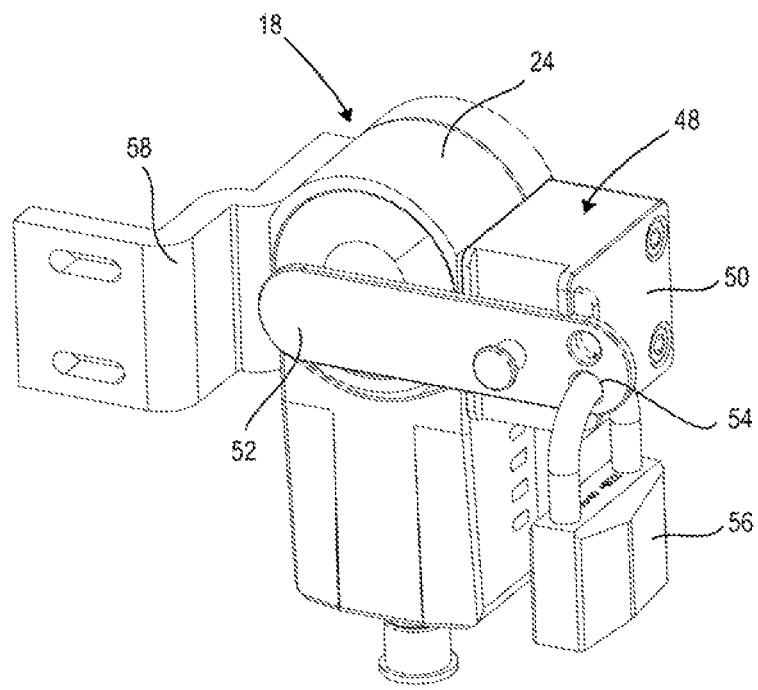
FIGS. 3A and 3B show a perspective view of the guard door monitoring module with a locking device, with FIG. 3A showing the frame part only of the guard door monitoring module and FIG. 3B showing the entire guard door monitoring module including the door part.
Figure 3B:
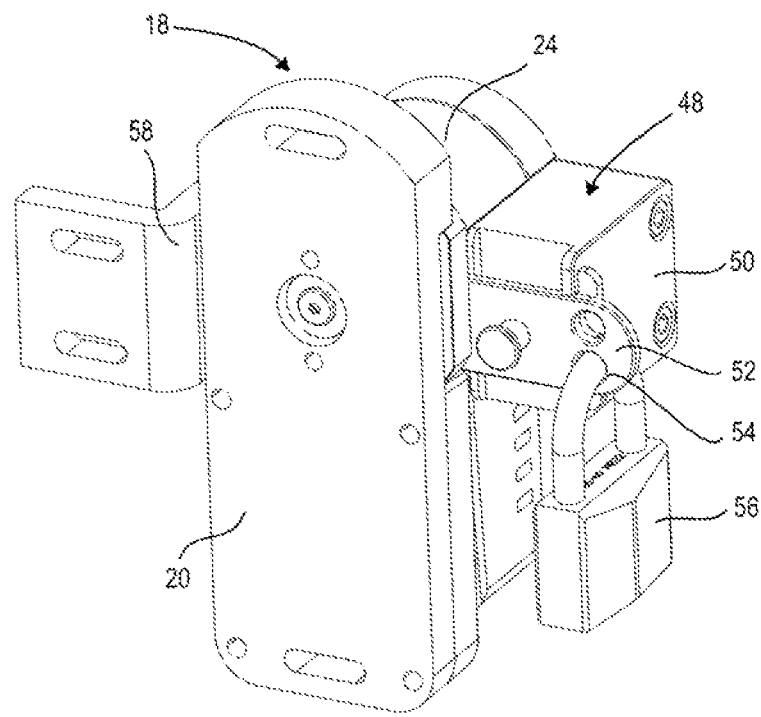

FIGS. 3A and 3B show an embodiment of the guard door monitoring module 18 with a locking device 48. Here, FIG. 3A shows merely the frame part 24 of the guard door monitoring module 18 together with the locking device 48 arranged thereon, whereas FIG. 3B shows a perspective view of the entire guard door monitoring module 18 inclusive of the door part 20 and the locking device 48 arranged on the frame part 24.

The locking device 48 has a main body 50 and a locking lever 52 arranged thereon. The locking lever 52 is substantially plate-shaped and is pivotable relative to the main body 50. In the position illustrated in FIG. 3A, the locking lever 52 is in the 'blocking position' thereof. In this blocking position the locking lever 52 prevents the electrically contactless interaction between the actuator 40 and the sensor 42. This is implemented in that the locking lever 52, as shown in FIG. 3A, is pivoted in front of the sensor 42 arranged in the frame part 42 of the guard door monitoring module 18. If an attempt is made to close the guard door 12 during this position of the locking lever 52, the locking lever 52 then keeps the frame part 24 at a distance from the door part 20. The actuator 40 located in the door part 20 is thus distanced from the sensor 42 arranged in the frame part 24. In some circumstances the guard door 12 then also can no longer close at all due to the locking lever 52 slid therebetween or pivoted therebetween. In any case, however, the locking lever 52 in the blocking position thereof prevents the sensor 42 from detecting the actuator 40 (RFID transponder). Irrespective of the position of the guard door 12, no guard door signal "door closed" can thus be sent to the control unit 32 in this case, and therefore a start-up of the machine or system 16 during this position of the locking lever 52 is impossible.

The locking device 48 already mentioned above is of significant advantage in the following conceivable situation: an operator, who enters the safety area 14 for example for repair purposes, automatically triggers the EMERGENCY OFF of the system 16 upon opening the guard door 12. By contrast, in order to ensure that during the repair works the guard door 12 does not accidentally close or is not unintentionally closed by another person, the operator brings the locking lever 52 of the locking device 48 into the above-mentioned blocking position. The locking device 48 also has a receptacle 54 for a padlock 56. The latter is also referred to generally in the present case as a lockable securing part 56. As soon as the operator has thus brought the locking lever 52 into the blocking position, said operator can additionally introduce a padlock 56 into the receptacle 54. It is then no longer possible to pivot the locking lever 52 from the blocking position thereof. If an attempt is made to pivot the locking lever 52, the padlock 56 would collide specifically with the main body 50 of the locking device 48, such that the locking lever 52 is blocked in the blocking position thereof.

Another person then attempting to close the guard door 12 will not succeed in doing so. It is only possible for the operator to release the locking lever 52 from the blocking position thereof, since only said operator has the key to the padlock 56. This provides immensely increased safety for the operator and additionally also improves the manipulation protection of the guard door monitoring module 18 or of the entire guard door monitoring system 10.

As can be seen from FIGS. 3A and 3B, a branch or bracket 58 is arranged on the frame part 24 of the guard door monitoring module 18 in order to mount the frame part 24 on the door frame or the doorjamb of the guard door 12. Similarly, the door part 20 of the guard door monitoring module 18 is also mounted on the movable part 22 of the guard door 12. It goes without saying that other connections instead of a screwed connection are also conceivable in principle.

Figure 4A:
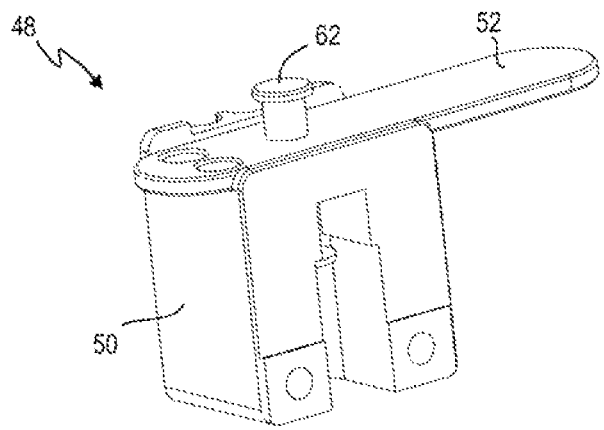
FIGS. 4A and 4B show the locking device shown in FIGS. 3A and B in a perspective view (FIG. 4A) and in an exploded illustration (FIG. 4B)

FIGS. 4A and B and FIGS. 5A-5D show further details of the locking device 48 according to the disclosure. As can be seen in the exploded view illustrated in FIG. 4B, the main body 50 is preferably fastened via screws 60, 60' to the frame part 24 of the guard door monitoring module 18. In order to be able to pivot the locking lever 52 by hand relative to the main body 50, the locking lever 52 has a holding grip 62. In principle, a pivot movement of the locking lever 52 driven by an actuator would also be conceivable. However, a pivotability of the locking lever 52 by hand offers easy handling and in addition saves costs for actuators that otherwise have to be provided in addition. The shown holding grip 62 preferably runs along the pivot axis 64 about which the locking lever 52 can be pivoted.

Figure 4B:
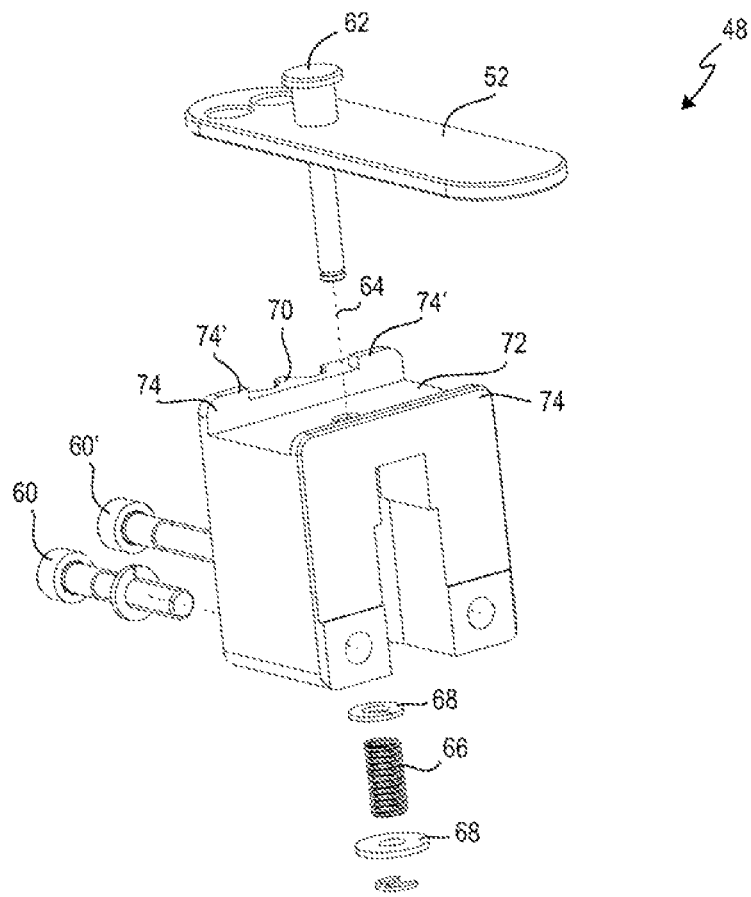

The locking lever 52 is coupled to the main body 50 via a spring element 66 arranged along the pivot axis 64 (see FIG. 4B). This spring element 66 exerts a spring force, which pushes the locking lever 52 against the upper side of the main body 50. For stabilization, additional washers 68 can be provided.

Figure 5A:
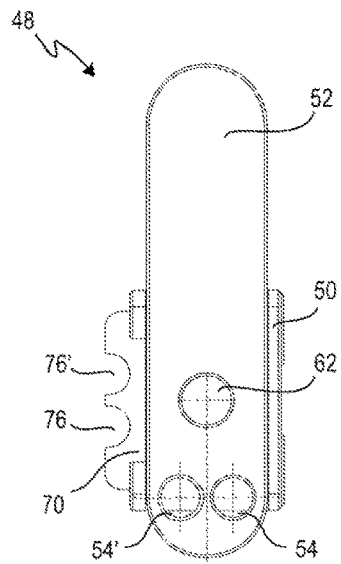
FIGS. 5A-5D show various side views of the locking device from FIGS. 4A and B for illustration of the release position (FIGS. 5A and B) and also of the blocking position (FIGS. 5C and D) of the locking device.
Figure 5C:
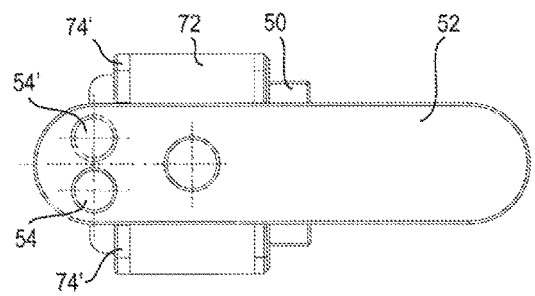
Figure 5B:
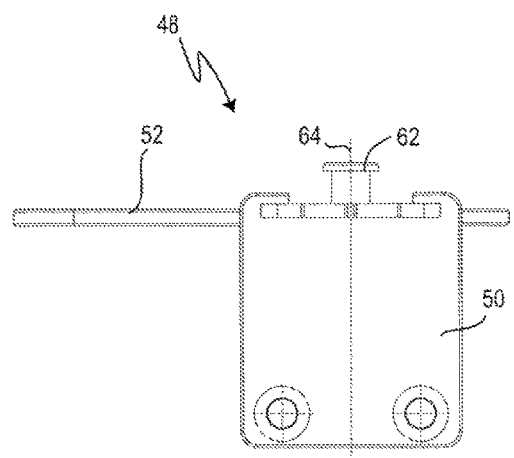
Figure 5D:
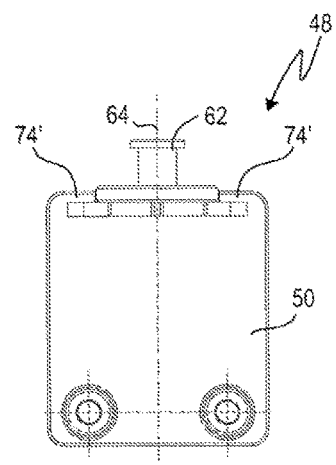

FIGS. 5A and 5B show various side views of the locking device 48, in which the locking lever 52 is in the release position. In this release position the locking lever 52 does not prevent the electrically contactless interaction between actuator 40 and sensor 42. FIGS. 5C and 5D by contrast show the locking lever 52 in the blocking position thereof. In order to bring the locking lever 52 from the release position thereof into the blocking position, said lever must be pivoted merely through 90° about the pivot axis 64 relative to the main body 50.

The locking lever 52 preferably can be latched to the main body 50 both in the release position and in the blocking position. The main body 50 to this end has on the upper side thereof two recesses 70, 72, in which the locking lever 52 can be arranged in an aligned manner. Here, a sort of form fit it is created between the locking lever 52 and the recesses 70 and 72. Both recesses 70, 72 are delimited laterally by webs 74 and 74' respectively. These serve as lateral walls, which then prevent the locking lever 52 from shifting or pivoting in the release position or in the blocking position. In order to pivot the locking lever 52 from the release position into the blocking position and vice versa, it must be pulled upwardly along the pivot axis 64 over the webs 74, 74' with the aid of the holding grip 62. Here, the operator must overcome the spring force exerted by the spring element 66. Only then can the locking lever 52 be pivoted through 90° into the respective other position.

As can also be seen from FIG. 5A, the locking lever 52 has not only one, but two receptacles 54, 54'. These receptacles 54, 54' are preferably formed as through-bores through the plate-shaped locking lever 52. As already mentioned, they are used so that an operator can introduce a padlock 56 therein in order to fix the locking lever 52 in the blocking position thereof. Two bores 54, 54' have the advantage that a plurality of (two) padlocks can be introduced thereinto. In this way, any operator can introduce his personal padlock into one of the two bores 54, 54'.

In FIG. 5A a further detail of the locking device 48 can also be seen. Two recesses 76, 76' are provided on the main body 50, which recesses are at least partially aligned in the blocking position of the locking lever 52 with the bores 54, 54' provided in the locking lever 52. These recesses 76, 76' in principle can also be formed as bores. They offer further mechanical protection, which prevents the locking lever 52 from being pivotable from the blocking position thereof when a padlock 56 has been fitted. Since the recesses 76, 76' are preferably aligned exactly with the bores 54, 54', when a padlock 56 is fitted into the one of the two openings a form fit so to speak is created between the hoop of the padlock and the respective bore 54, 54' or recess 76, 76'.

Figure 6A:
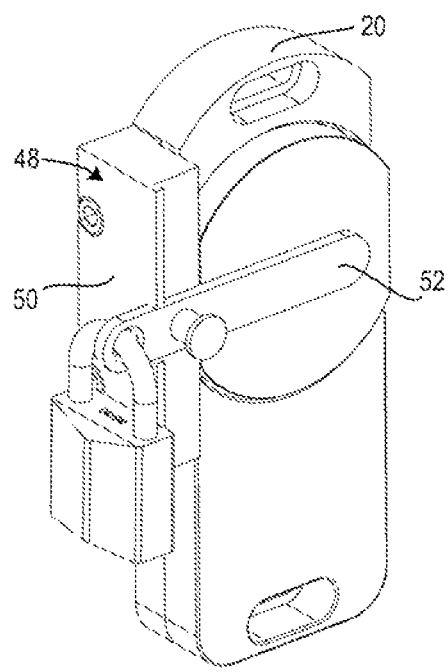
FIGS. 6A and 6B show a perspective view of the guard door monitoring module with locking device in accordance with a second embodiment, with FIG. 6A showing the door part only of the guard door monitoring module and FIG. 6B showing the entire guard door monitoring module including the frame part.
Figure 6B:
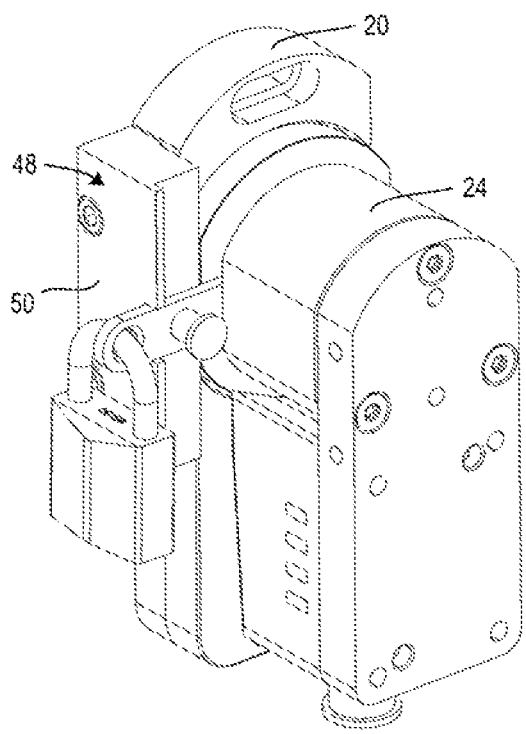

FIGS. 6A and B show a further embodiment. In contrast to the embodiment shown in FIG. 3, the locking device 48 is not arranged here on the frame part 24, but on the door part 20. The locking device 48 is thus arranged here in other words on the actuator 40 and not, as in FIGS. 3A and B, on the sensor 42. The function and construction of the locking device 48, however, can remain the same here. Merely the main body 50 is designed slightly differently, for example narrower.

To summarize, the inventors have also managed additionally to improve the guard door monitoring system by a locking device additionally used therein. The presented locking device, in particular in the case of systems into which it is not easy to see, prevents an unintentional closure of the guard door whilst an operator is still located in the safety or dangerous area. The locking device according to the disclosure is characterized in particular by easy handling and also by the low possibility for manipulation thereof.

What is claimed is:

1. A guard door monitoring system, comprising:
   a guard door as an entrance to a safety area,
   a guard door monitoring module for monitoring a state of the guard door, having an actuator and a sensor, which can be brought into interaction with one another in an electrically contactless manner and thereby generate a guard door signal,
   a control unit, which is configured to analyze the guard door signal and to control a machine or system located in the safety area depending on the guard door signal, and
   a locking device with a main body and a locking lever arranged on the main body, wherein the locking lever is mechanically pivotable relative to the main body about a pivot axis from a release position into a blocking position in which the locking lever prevents the electrically contactless interaction between the actuator and the sensor, wherein the locking lever is coupled to the main body via a spring element which is arranged along the pivot axis, wherein a first and a second recess are provided on the main body, wherein the first recess is delimited laterally by at least one first sidewall and the second recess is delimited laterally by at least one second sidewall, wherein, when the locking lever is in the release position, the locking lever is arranged in the first recess, the at least one first sidewall prevents the locking lever from pivoting about the pivot axis, and the spring element exerts a spring force that pushes the locking lever against the main body, wherein, when the locking lever is in the blocking position, the locking lever is arranged in the second recess, the at least one second sidewall prevents the locking lever from pivoting about the pivot axis, and the spring element exerts the spring force that pushes the locking lever against the main body, wherein the locking lever must first be moved in a direction of said pivot axis against the spring force of the spring element to free said locking lever from said first recess and said second recess, and thereby enable pivotable movement of said locking lever from said release position and from said blocking position, respectively, and wherein the locking device comprises a receptacle for a lockable securing part, which, when introduced into the receptacle, keeps the locking lever in the blocking position.

2. The guard door monitoring system as claimed in claim 1, wherein the guard door monitoring module further comprises an electromagnet for a magnetic locking of the guard door.

3. The guard door monitoring system as claimed in claim 1, wherein the locking lever, when in the blocking position, prevents the electrically contactless interaction between the actuator and the sensor by mechanically distancing the actuator and the sensor from one another.

4. The guard door monitoring system as claimed in claim 1, wherein the guard door is a first or second part of a guard door system, wherein the sensor is arranged on the first part of the guard door system and the actuator is arranged on the second part of the guard door system, wherein the two parts of the guard door system are separated from one another when the guard door is opened.

5. The guard door monitoring system as claimed in claim 4, wherein the locking device is arranged on the first part of the guard door system.

6. The guard door monitoring system as claimed in claim 4, wherein the locking device is arranged on the second part of the guard door system.

7. The guard door monitoring system as claimed in claim 1, wherein a holding grip is provided on the locking lever for pivoting the locking lever by hand, said holding grip running substantially along the pivot axis.

8. The guard door monitoring system as claimed in claim 1, wherein the receptacle for the lockable securing part is formed as a bore in the locking lever.

9. The guard door monitoring system as claimed in claim 8, wherein a third recess is provided on the main body, wherein said third recess, when the locking lever is in the blocking position, is at least partially aligned with the bore provided in the locking lever.

10. The guard door monitoring system as claimed in claim 1, wherein two bores are provided in the locking lever each as the receptacle for the lockable securing part, and two additional recesses are provided on the main body, said additional recesses, when the locking lever is in the blocking position, are at least partially aligned with the bores provided in the locking lever.

* * * * *